Aug. 26, 1969    M. N. MUSGRAVE    3,463,406

NUT HARVESTER

Filed Aug. 24, 1967

INVENTOR.
MERRILL N. MUSGRAVE
BY
Christensen, Sanborn & Matthews
ATTORNEYS

United States Patent Office 3,463,406
Patented Aug. 26, 1969

3,463,406
NUT HARVESTER
Merrill N. Musgrave, 1610 E. Boston Terrace,
Seattle, Wash. 98102
Filed Aug. 24, 1967, Ser. No. 662,976
Int. Cl. B02c 17/02, 23/02
U.S. Cl. 241—86            6 Claims

ABSTRACT OF THE DISCLOSURE

Macadamia nuts grown in Hawaii are harvested by lifting them from the ground beneath the trees, where they they have fallen. Suction is commonly employed, as it is elsewhere and for other nuts. Suction picks up husks, leaves, twigs, and even bits of light volcanic rocks, as well as the nuts. It is necessary to separate such trash from the nuts in the simplest and most direct manner, and it is to this object that the present invention is directed. Such separation is effected in the suction duct, wherein all the material picked up passes through a cylindrical cage defined by non-rotative rings spaced axially by a distance approximating the smallest nut it is intended to collect, all such material being acted upon as it starts axially through the cage by a series of generally radially directed rotating blades, the tips whereof extend between adjacent rings, these blades being spaced axially by a distance less than the size of the smallest nut that is to be saved. The relative rotation of the blades and of the rings tends to effect some breaking up of the trash, while the blades, the leading edges whereof define a helix, advance the nuts that enter at one end towards an exit at the other end. Additionally, yet optionally, non-rotative teeth that lie in planes intermediate the rotating blades will engage bits of trash tending to rotate with the blades, and so will break up the same. Thereby nuts and trash are separated at a single point in the short suction duct, the nuts passing to bins or sacks, and the trash falling upon the ground or being otherwise disposed of. The length of the harvester is thereby kept short, and it is easily maneuverable.

---

The harvester of this invention is especially designed for harvesting macadamia nuts, under conditions existing in Hawaii, although the principles of the invention can be applied to the harvesting of other nuts, under other conditions.

Prior art

Suction is used in various nut harvesters, an example being the Helfrich Patent No. 2,807,128. Generally the separation of nuts from trash has been a primary problem. The Scafidi Patent No. 2,718,745 utilizes a rotative cage, but this does not actually separate, nor does it advance nuts axially. The Stokes Patent No. 2,593,625 employs rotative blades or beaters and interspersed stationary beaters, but nuts are delivered radially, and Stokes emphasizes the importance of carefully rolling and smoothing the ground whereon the nuts are to fall, which is impractical in ground containing many volcanic bits and crevices, and further, for economic reasons.

Detailed description

Figure 1:
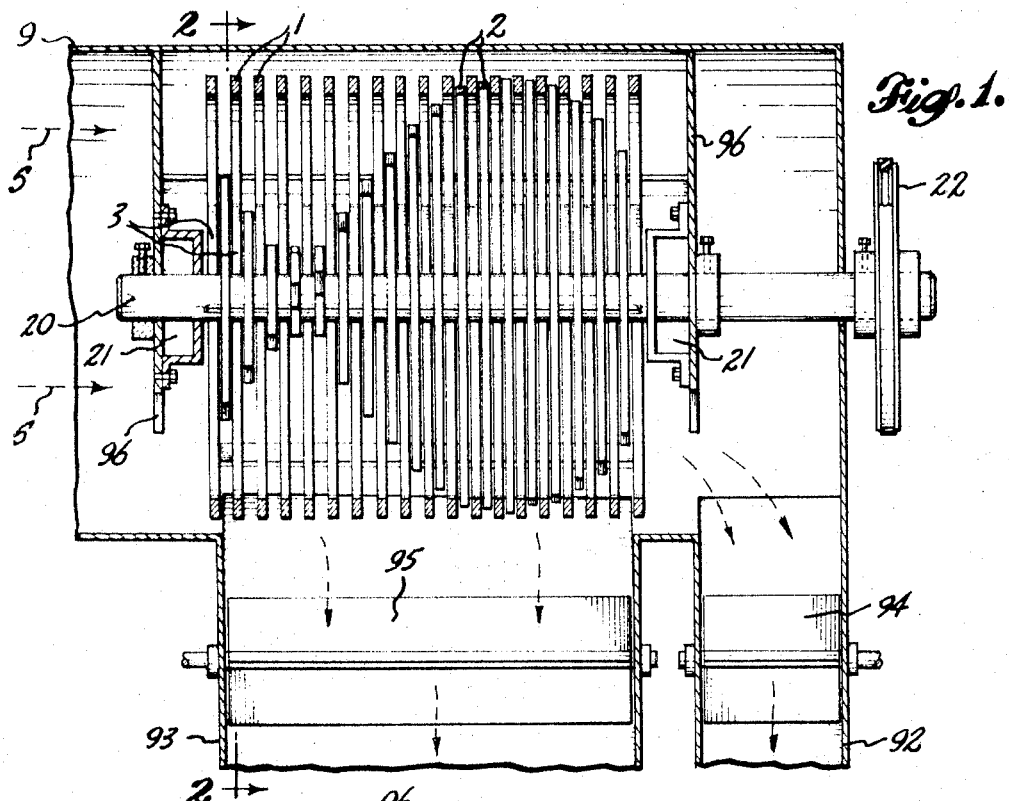
FIGURE 1 is an axial sectional view of the harvester, illustrating the mechanism within the suction duct for separating the trash from the nuts, and for delivering each to a different destination.
Figures 2, 3:
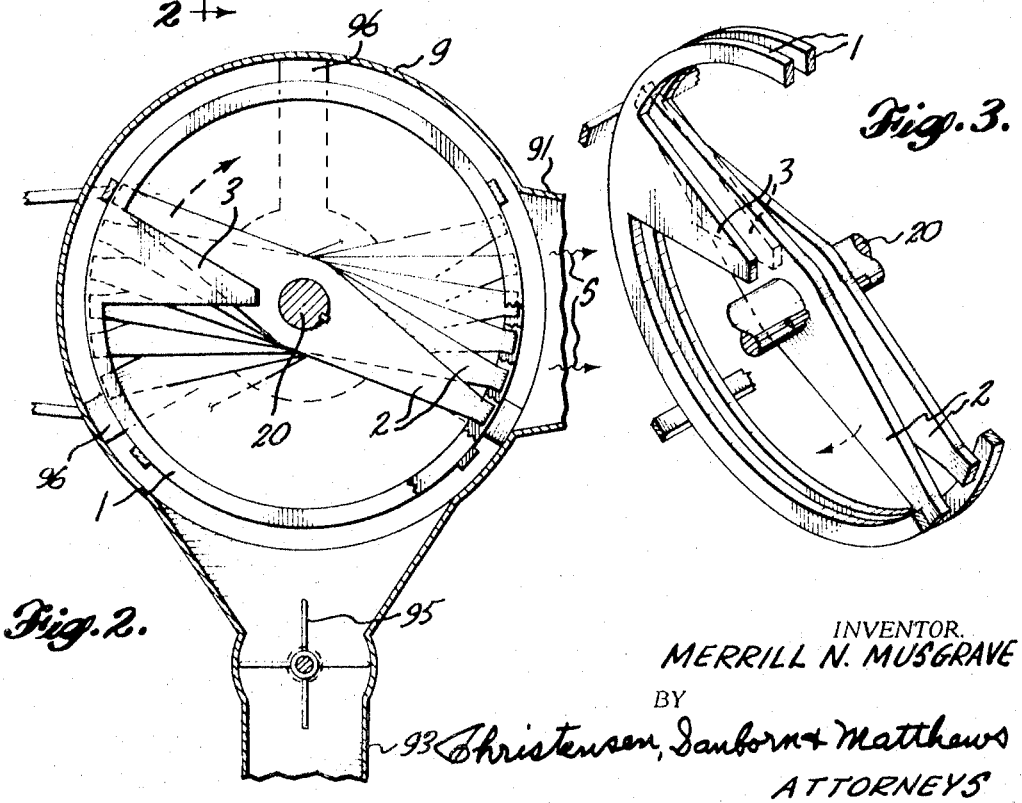
FIGURE 2 is a cross-section through the separator, taken at the line 2—2 of FIGURE 1.
FIGURE 3 is a detail isometric view of the cooperating parts of the separator.

The suction nozzle, suction fan, vehicle, and means for collecting nuts and for disposing of trash, all of which are common in nut harvesters of this general type, have not been shown, and could be of any suitable form. The casing 9 is part of a suction duct, the direction of suction being indicated by the arrows S. The suction duct, in the portion with which this invention deals, is cylindrical. From it leads an outlet at 91 to the suction fan, a chute at 92 for the separated nuts, and a discharge chute at 93 for trash. Rotary valves at 94 and 95 allow discharge from the chutes while preserving suction within the casing 9; other suitable means to that end may be used.

Within and spaced somewhat from the casing 9 a series of equal, coaxial rings 1 are spaced apart by a distance approximating the smallest size of nuts that are to be collected. These define a cage to confine the nuts. Trash, however, passes between the rings and falls into the chute 93. Since some of the trash—twigs, some leaves and even bits of volcanic stone—that is carried by suction into the cage is too large to pass between the rings, means are provided to break it into smaller pieces. These will be described later.

All material enters the cage at one end. The nuts pass axially through the cage for discharge at its other end. To advance the nuts, and to break up the trash at least partially, a series of blades 2 are provided. These are spaced apart so that their tips fit, with slight clearance, between the rings 1. These radially directed blades 2 are supported upon and rotate with a shaft 20 located along the axis of the cage. They are so arranged that their leading edges define a helix. The blades are spaced apart, but insufficiently that nuts can pass between them. In consequence their helical formation serves to advance nuts axially, and their contact with trash tends to break up the latter into bits small enough to pass between the rings 1.

The blades may serve adequately to break up the trash; however, to insure that it is broken small enough, I may employ teeth 3, which can be supported on the several rings 1, to project radially inwardly. These fixed teeth 3, preferably having their leading edges aligned, engage trash that the blades 2 may tend to carry about the interior of the cage, and so cooperate with the blades to break it up. When the trash is small enough, it falls through between the rings to the trash outlet 93.

The only rotating part is the shaft 20 and its series of blades 2. The shaft is journaled within the casing 9, at 21, and can be rotated by the pulley 22 driven from a suitable source of power (not shown). The journals 21 at the ends of the casing are supported by spiders 96.

Suction developed in the duct and casing 9 draws nuts, leaves, twigs and usually dust and small bits of stone from the ground, and delivers the mixture within the cylindrical cage. The blades 2 rotating within the cage advance the nuts towards the nut chute at 92, and serve to break up the trash, assisted by the teeth 3 if the latter are used. Comminuted trash falls into the trash chute 93, or if small enough passes to and through the fan through the outlet 91. All separation occurs at the cage, and no extended or intricate path need be followed. The separator is sufficiently small that the vehicle by which it is carried is small and easily maneuverable. There need be no preparation of the ground, for the suction will pick up even nuts that fall into pockets or crevices in the surface.

I claim as my invention:

1. A nut harvester comprising, in combination with a suction duct wherein nuts and trash are moved by suction from a pick-up point to a separating point, separating means at the latter point comprising a cage formed of a plurality of rings arranged in parallel planes, and a plurality of rotative blades each interposed between a ring and the next adjacent ring, with the leading edges of successive blades arranged helically with respect to such edges of adjoining blades, the axial spacing of the rings and of the successive blades approximating the size of the smallest nut to be separated from the trash.

2. A nut harvester as in claim 1, including a plurality of non-rotative teeth, one projecting radially inwardly from each ring intermediate the rotative blades, whereby trash tending to rotate with the blades is broken up upon contact with the teeth.

3. A nut harvester as in claim 2, wherein the teeth are fixed with their edges in axial alignment.

4. A nut harvester comprising, in combination with a suction duct wherein nuts and trash are moved by suction from a pick-up point to a separating point, separating means at the latter point comprising a plurality of fixed and coaxial rings spaced apart in parallel planes, a rotative shaft supported coaxially of said rings, and a plurality of blades projecting radially of and rotative with said shaft, the tips of the individual blades being each interposed between a ring and the adjoining ring, and the leading edges of the several blades defining a helix, the spacing of the rings and of the several blades being less than the size of the smallest nut to be separated from the trash.

5. The combination of claim 4, wherein the rings are all of like inside diameter.

6. The combination of claim 4, including a tooth projecting radially inwardly from each of the several rings substantially to the shaft, and intermediate the rotative blades.

References Cited

UNITED STATES PATENTS

| | | | |
|---|---|---|---|
| 1,419,407 | 6/1922 | Pardee | 241—83 |
| 2,273,405 | 2/1942 | Hoehn | 241—86 |
| 3,113,733 | 12/1963 | Carlson | 241—68 |

GERALD A. DOST, Primary Examiner

U.S. Cl. X.R.

241—68, 188